INVENTORS
STANLEY A. AGNEW
WALTER N. CANULETTE
BY
Edmund W Bopp
AGENT

INVENTORS
STANLEY A. AGNEW
WALTER N. CANULETTE
BY
Edmund W Bopp
AGENT

3,446,935
NONCONSUMABLE ELECTRODE ARC SPOT WELDING OVERCOMING A HEAT BLOCK OR LOSS
Stanley A. Agnew, New Providence, and Walter N. Canulette, Berkeley Heights, N.J., assignors to Air Reduction Company, Incorporated, New York, N.Y., a corporation of New York
Continuation-in-part of application Ser. No. 366,299, May 11, 1964. This application Aug. 17, 1964, Ser. No. 390,076
Int. Cl. B23k 9/12, 11/10
U.S. Cl. 219—127                                6 Claims

ABSTRACT OF THE DISCLOSURE

The method of making spot welds between workpieces and more particularly workpieces which have refractory coatings. While using the nonconsumable electric arc welding process the arc action is used to melt the metal in the top workpiece and push it aside by narrowing the arc gap and/or by increasing the arc current so that the arc may be directed on the refractory interface between the workpieces to break it away thereby permitting the molten metal of the two workpieces to mix together. After the interface is broken and the metals mix the arc action is reduced by widening the arc gap and/or by reducing the arc current to permit the metal pushed aside to flow back to fill the arc-created crater.

---

This invention relates to arc spot welding by means of a substantially nonconsumable electrode, and more particularly to arc spot welding where there is a heat block, heat barrier or heat loss giving rise to a problem of transmitting sufficient heat through one workpart, and across an interface, to the other workpart to join two lapped workparts by an arc spot weld.

The present application is a continuation-in-part of our application Ser. No. 366,299 filed May 11, 1964, now abandoned.

In one application of the invention, the heat block or heat barrier comprises a tenacious and/or refractory interface between the workparts to be spot welded.

In another application, the heat block or heat barrier is inherent in a relatively great thickness of metal through which it is necessary to transmit heat from one workpart to the other, in which case the heat block or barrier may amount to an excessive heat loss due to lateral transmission of heat in the thick metal workpart preventing sufficient heating of the region at the interface where the weld is wanted.

In an arc spot welding operation, a tenacious and/or refractory coating is objectionable in two respects: (1) as a physical barrier to the coalescence of molten material from each of two contacting workparts to form the weld, and (2) as a heat barrier that increases the difficulty of obtaining molten material in both parts when applying heat to only one of the parts.

One class of tenacious and/or refractory coatings comprises those that are naturally formed upon a surface, for example, aluminum oxide spontaneously formed upon aluminum or upon an alloy of aluminum.

Another class of such coatings comprises those that are deliberately applied. One example of this class is plating, such as zinc upon a base metal. Another example is paint, which when included between two workparts forms a barrier as above described.

The term "interface" as used herein is to be understood to mean either the boundary between two lapped workparts, or a boundary region between the same, which region may comprise one or more layers, coatings or crusts of material present upon the surface of either or both of the lapped workparts. When a layer, coating or crust is mentioned in the singular, it is to be understood that the expression is intended to include the usual case wherein there are two layers, coatings or crusts, one on each of the lapped workparts, as well as the case wherein only one of the lapped workparts has such a layer, coating or crust.

While the invention will be described herein with particular reference to arc spot welding of materials having a tenacious and/or refractory coating, and more especially to aluminum or aluminum alloy coated with aluminum oxide, it will be understood that the same principles are applicable to other base materials and other tenacious and/or refractory coatings, and also to arc spot welding of coated or non-coated workparts throughout an extended range of thicknesses.

An object of the invention is to facilitate arc spot welding under adverse conditions of heat transmission between the workparts to be joined.

Another object is to facilitate arc spot welding of materials having a tenacious and/or refractory coating.

Another object is to arc spot weld thicker workparts than can be satisfactorily spot welded by prior art methods.

Another object is to arc spot weld thinner aluminum workparts that can be satisfactorily spot welded by prior art methods.

A more specific object is to maintain substantially complete control of the position of the electrode tip relative to the work while placing and maintaining the arc in proper proximity to the interface to disrupt a tenacious and/or refractory coating, if such a coating is present, as well as to apply the heat of the arc effectively over a sufficient area of the interface to effect a proper weld; and to accomplish the aforementioned results with complete freedom of choice to add metal to the weld or not; with complete freedom from the difficulties inherent in the use of a consumable electrode in arc spot welding; and with complete and positive control of the position of the electrode tip relative to the work during the entire arc spot welding process.

Another object is to eliminate the need for removing a surface coating from a workpiece preparatory to arc spot welding.

Another object is to increase the strength of an arc spot welded joint.

A specific object is to permit the arc spot welding of materials such as aluminum or aluminum alloy in the condition ordinarily received from suppliers thereof without the necessity of first removing oxide coating from the pieces to be joined.

Another object is to avoid porosity in a finished arc spot weld, particularly in aluminum.

Another object is to attain a high degree of reproducibility of strength values in successive arc spot welds.

Another object is to improve the ease of programming of automatic or semi-automatic arc spot welding.

Another object is to increase the area at the interface of an arc spot weld under given welding conditions.

Another object is to insure a satisfactory arc spot weld regardless of imperfect fit between workparts or the presence of a tenacious and/or refractory interface.

A feature of the invention is a shifting of the relative position of a substantially nonconsuming electrode with respect to the surface of the upper workpart or with respect to the interface between the workparts; and/or a variation of the arc current, to regulate the operations of producing molten material in the upper and lower workparts, and/or to disrupt and disperse a tenacious and/or refractory coatings.

Another feature is a programming of the time spent by the electrode in the various positions, or of the arc current as a function of time, to accomplish the various objectives of the methods in accordance with the invention.

Nonconsumable electrode arc spot welding of materials having or forming a tenacious and/or refractory coating presents difficulties which have not, as far as we are aware, been satisfactorily overcome, even though the problem has been known for a long time and various attempts have been made to solve it.

In the case of aluminum and its alloys, the metal begins to oxidize instantly at room temperature to form a surface coating of tenacious and refractory aluminum oxide. Thus, two layers of this oxide become interposed between two sheets of aluminum which are to be joined by arc spot welding and, during the usual welding process, the oxide remains solid, even though the aluminum on both sides of the oxide layer is melted by the heat of the arc, so that the two melted portions of aluminum are physically prevented from coalescing to form a welded joint. The oxide layer remains solid because it has a melting temperature in the neighborhood of 3600° F. whereas pure aluminum melts at 1220° F. Furthermore, the oxide layer blocks the flow of heat from the upper workpart to the lower workpart, thus hindering the melting of the material of the lower workpart. Therefore, to permit the two molten masses to coalesce, it is necessary that the oxide layer in some way be disrupted and dispersed.

The usual intensities of heat and mechanical force of a stationary welding arc held in close proximity above the oxidized surface of an aluminum sheet are effective to disrupt and float aside the oxide coating, and the use of inert gas to shield the arc discharge and blanket the surface of the sheet serves to prevent a new layer of oxide from forming during the time required to complete a welding operation. It will be evident, however, that in tungsten-inert gas arc spot welding, the oxidized surfaces between the two overlapping sheets to be welded are protected from the heat and force of the arc by the molten material of the sheet to which the arc is struck. While the heat and force of the arc are effective to disrupt and float aside the outer oxide coating of the upper sheet and to melt the metal down to the lower oxide coating of that sheet, the oxide interface coatings do not melt under this procedure and the heat of the arc is partially transmitted through the two oxide coatings into the lower sheet of metal which may also be melted to a greater or less degree of penetration. The upper and lower molten masses are separated by the solid oxide crusts which operate to prevent coalescence to form a single mass which can solidify into a weld between the two sheets.

A related problem arises in the case of arc spot welding a relatively thick workpart due to the geometry involved in the heat transmission from one workpart toward the other and due to the lateral transmission of heat amounting to a heat loss or effective heat block.

It is known that the heat of a welding arc as applied in the prior art penetrates the work in the general form of a conical volume with the apex of the cone extending inwardly. In order to effect a weld, this cone must intersect the interface between the upper and lower parts to be welded. If the top part is relatively thick, the cone may not extend far enough to penetrate the bottom part, or the area of the intersection, which determines the area of the weld, may be insufficient to make a secure weld. For moderate thickness of top workpart, the size of the electrode may be increased and the power of the arc may be increased proportionately to obtain a large enough cone to provide the desired area of weld. While this is satisfactory in some cases, in other cases the increased heated area at the top surface of the upper workpart may be undesirable. For very thick top sheets, the capacity of the welding apparatus may be insufficient to provide a large enough cone of heating. Furthermore, the large heat conductance and large heat capacity of the top sheet may draw so much heat off laterally that it is virtually impossible to melt through the top sheet however much power is applied to the arc.

In accordance with one embodiment of the invention, the heat of the arc is effectively applied to the region of the interface through a relatively thick workpart by appropriate advancement of the tip of the nonconsumable electrode relative to the interface. The welding arc is started as usual and the electrode is held in a position above the top surface of the upper workpart upon which a molten pool is formed in the upper workpart beneath the arc. As previously described, the force of the arc causes a depression in the molten metal, termed a crater, the depth of which is directly related to the proximity of the tip of the electrode to the plane of the top surface of the upper workpart. The depth of the crater may next be extended below the interface between the workparts by advancing the electrode into the crater, so that sufficient metal of the lower workpart is melted. The electrode may now be withdrawn with the arc playing upon the pool of molten metal to allow the molten metal to coalesce and to refill the crater, and to prolong the heating of the weld while allowing entrapped gas to escape from the molten metal.

In accordance with another embodiment of the present invention, tenacious and/or refractory interface coatings or crusts such as aluminum oxide are disrupted by the force of the arc discharge from a substantially non-consuming electrode by appropriate placement of the tip of the electrode relative to said crusts. The welding arc is started by any one of several available methods and the electrode is held in a fixed position above the top surface of the upper sheet such that the oxide coating on this surface is disrupted and floated aside by the force of the arc and a molten pool is formed in the upper sheet beneath the arc. The force of the given welding arc causes a depression in the molten metal, termed a crater, the depth of which is directly related to the proximity of the tip of the electrode to the plane of the top sheet surface. The crater may be of such depth that the oxide layers between the two sheets are also disrupted and floated aside. If not, the current must be increased or the tip of the electrode must be moved forward until this effect is achieved. These layers are, at the time, resting upon the surface of a pool of molten metal in the lower sheet which has been heated to melting temperature by heat from the arc transmitted through the oxide film without melting the latter. The force of the arc in sufficiently close proximity to the oxide film ripples or otherwise agitates the surface of the pool of molten metal below, thereby disrupting the brittle film of oxide which is then blown away from the center by the force of the arc; the action being analogous to use of a jet of air to break up and blow away a thin sheet of ice floating upon the surface of water.

After the oxide coatings have thus been disrupted and blown aside, the molten portions of the two sheets can then coalesce to form a weld. When adequate coalescence has been allowed to occur, the arc current is reduced, or extinguished, and/or the electrode retracted, to allow the molten material that was blown aside to flow back into, fill, the crater.

The current is then preferably maintained at a lower than welding current level, or the electrode held in a raised position, with the arc playing upon the pool of molten material for a sufficient interval of time to properly complete the weld, and to promote the expulsion of gas from the molten material before the weld is allowed to solidify, thereby reducing the likelihood of porosity occurring in the finished weld.

In accordance with the invention, a strongly desirable feature of the consumable electrode process, the penetrating arc which can disrupt the oxide barrier, has been incorporated into the nonconsumable electrode process to provide the best advantages of both processes in one process most suitable for arc spot welding. In accordance with the invention, welding variables, for example, current, wire feed, and electrode tip position are entirely independently variable and controllable. In addition, welding variables are under more positive control than in the consumable electrode process, so much more so, in fact, that sheets in the foil range of thickness are weldable whereas the consumable electrode process is restricted to sheet thicknesses in excess of about 0.030 inch. Because of the superior control of the welding variables, more consistent results are obtained at all thickness levels than with the consumable electrode process. Of specific advantage, independent controllability of current and wire feed speed leads to welds of superior appearance.

There are many other advantages which make the nonconsuming electrode inert gas shielded process preferable over the consumable electrode process for arc spot welding. With the nonconsuming electrode, there is no necessary addition of metal to the weld. No metal need be deposited and no filler wire need be used. The process avoids the problems related to the feeding of wire to the arc, involving wire drag, slippage, sliding electric contact with the wire electrode, etc. The process is more easily programmable because of the fact that the welding parameters are independently controllable. Penetration can be had at low currents, or alternatively, the current may be increased while the electrode is in the down position to increase the area of the weld at the interface.

With the nonconsuming electrode, it is feasible to make a compromise by holding the electrode close enough to the interface to obtain desired penetration but far enough away to give sufficient area of heating. The process gives assurance of a satisfactory weld regardless of imperfect fit between the contacting workparts or the presence of a tenacious and/or refractory interface. By use of a welding current source with a drooping voltage-current characteristic, the process provides positive control over current.

The greater controllability of the movement of the tip of the nonconsuming electrode is found to allow the necessary width of weld at the interface to be attained at greater depths than with other processes.

Other objects, features and advantages will appear from the following more detailed description of illustrative embodiments of the invention, which will now be given in conjunction with the accompanying drawings.

Figure 1:
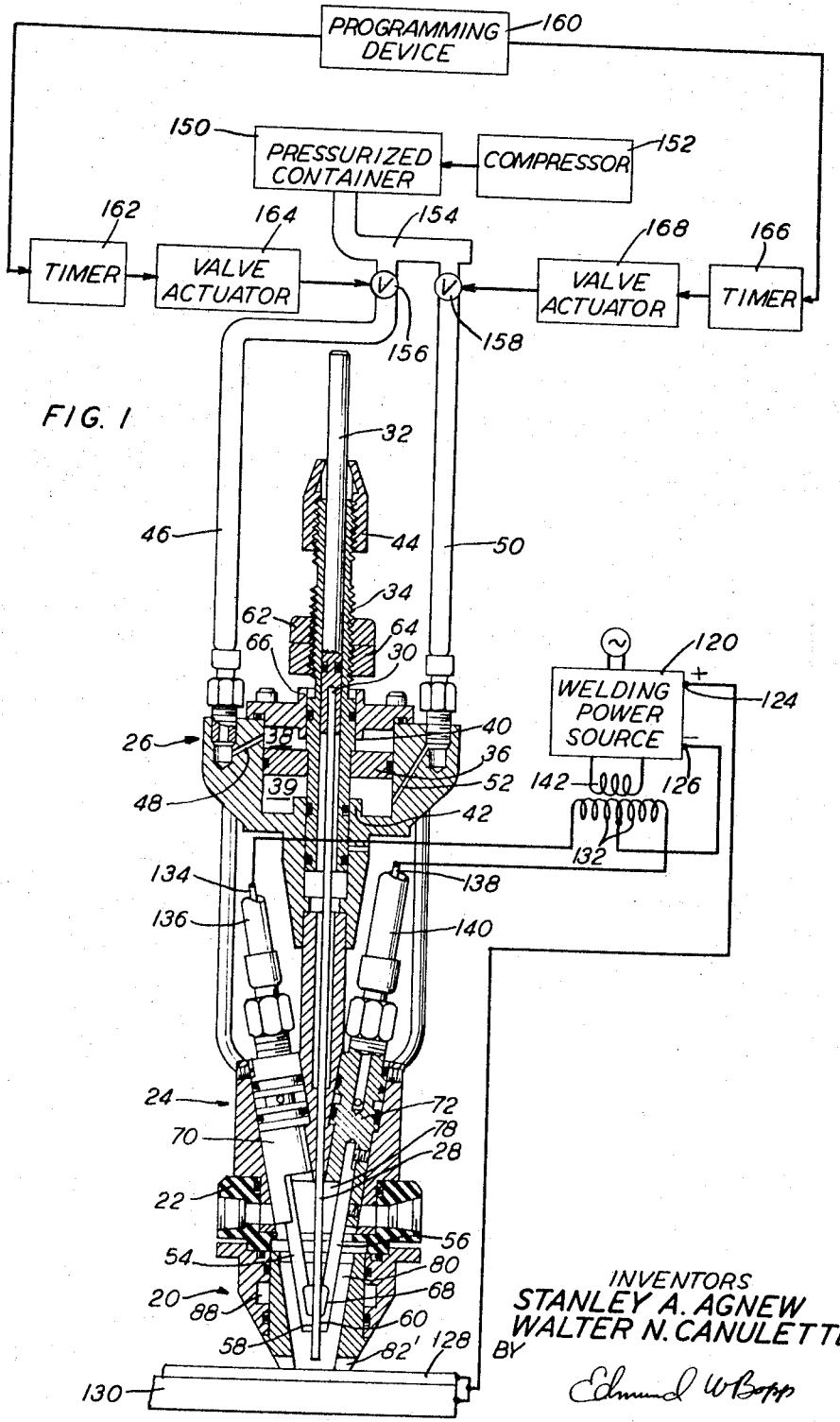
FIG. 1 is an elevational view, partly in cross-section and partly in schematic diagram form, of welding tool, workparts to be welded and control devices, in accordance with one embodiment of the invention.

FIG. 1 shows a portion of a welding machine or tool having a nonconsuming electrode rod 28 held in a socket 30 in the lower end of a cylindrical electrode holder 32. The member 32 extends through a hollow piston rod 34 which is rigidly attached to a piston 36 which is slidably enclosed in a pneumatic cylinder 38, 39. Movement of the piston 36 is limited by stops 40 and 66. The member 32 is clamped to the piston rod 34 as by means of a collet 44. Compressed air or other pressure medium may be fed into the portion 38 of the cylinder above the piston 36 through a conduit 46 and a passageway 48, and into the portion 39 of the cylinder below the piston 36 through a conduit 50 and a passageway 52.

The lower end of the arc electrode rod 28 is held in frictional and electrically conductive engagement with a contact shoe 60. For the sake of clarity in the drawing, other portions of the welding machine or tool proper, commonly incorporated in practice, are omitted from the drawing as not being necessary to the explanation of the invention.

The welding power is furnished by a welding power source 120, schematically representing a programmable power supply in which the current may be varied as a function of time to carry out various embodiments of the invention. The source 120 may be specially designed for a particular application, or a desired program can be set up on a general purpose welding power supply device such as disclosed in Patent No. 3,123,761, issued Mar. 3, 1964, to William J. Greene, assigned to the same assignee as the present application.

In applications involving the movement of the electrode 28 to effect the purposes of the invention, the position of the electrode may be controlled by any suitable means such as compressed air or other suitable pressurized medium contained in a pressurized container 150 in which pressure is maintained in known manner by a compressor 152. The container 150 is connected through a manifold 154 and through throttle valves 156 and 158 in parallel, to the conduits 46 and 50, respectively. The valve 156 is opened and closed according to a predetermined program by means such as a suitable programming device 160, a timer 162 and a valve actuator 164. The valve 158 is similarly controlled by the device 160 through a timer 166 and a valve actuator 168.

After starting the arc by any suitable method, the operation of the valves 156 and 158 is so arranged that valve 158 is open and valve 156 is closed so that pressure is maintained in the lower chamber 39 to hold the electrode in the raised position until the pool of molten material has been formed in the workpart 128 to render the oxide susceptible to being disrupted by arc pressure. At this time, valve 158 is closed and valve 156 is opened, thereby admitting pressurized medium into chamber 38 above the piston and lowering the piston and the electrode to the lower position. Check valves or bleeder valves may be provided in known manner so that when pressure is introduced on one side of the piston, the pressure on the other side of the piston is automatically reduced. The electrode is maintained in the lowered position over a time interval sufficient to permit the arc to break down and scatter the oxide interface and complete sufficient melting of a region of the plate 130 to provide a suitable coalesced volume for the weld. The valve 156 is then closed and the valve 158 is then opened, to raise the piston and electrode again. The electrode is maintained in the raised position over a time interval sufficient to permit the molten material that was blown aside by the lowered electrode to flow back into the crater from which it came and to permit the molten material to coalesce into a single mass while heating by the arc is continued so as to complete the weld, and to promote the expulsion of gas bubbles from the molten material in order to reduce porosity in the finished weld.

The valves 156 and 158 may be opened at any suitable rate to control the rate of change of position of the piston in going from one extreme position to the other, in order to make a gradual transition from one position of the electrode to another. The rate of transition may be programmed if desired.

The welding current may be held constant at a suitable value during the entire time required to complete a spot weld, or different values of current may be incorporated into the program at different stages.

FIGS. 2 through 6 show diagrammatically the approximate state of the metal at various stages of the spot welding process in accordance with the invention, and, for an embodiment in which the position of the electrode is varied, the approximate relationship between the electrode and the workpieces at each stage.

Figure 2:
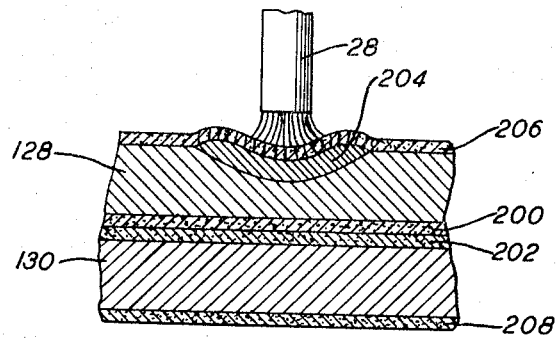
FIGS. 2 through 6 are diagrammatic representations mainly in cross-sectional view, of a welding electrode and sheets being spot welded, to show successive stages in the method of spot welding wherein the electrode position is programmed in accordance with one embodiment of the invention.

FIG. 2 shows the electrode 28 in its raised position shortly after the start of the welding process. The upper part 128 to be welded is shown with its lower layer 200 of oxide in contact with the upper layer 202 of oxide of the lower part 130, the layers 200 and 202 together constituting the refractory interface between the upper and lower workparts. For emphasis, the oxide layer is shown exaggerated in thickness compared to the workpart. The upper layer of oxide on the part 128 is shown at 206 and the lower layer of oxide on the part 130 at 208. The pool 204 of molten metal is shown extending at this stage part way through the upper workpart 128.

Figure 3:
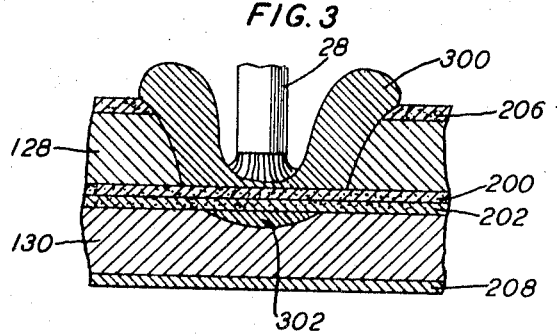

FIG. 3 shows the electrode 28 in lowered position after the pool has been extended to the oxide interface. Molten material in a mass 300 above the interface is shown as it has been blown aside by the force of the arc and heaped up around the edges of the crater that has been formed. Another mass 302 or pocket of molten material is shown below the oxide interface, which latter mass has been heated by heat transmitted through the oxide interface without disrupting the oxide layers.

Figure 4:
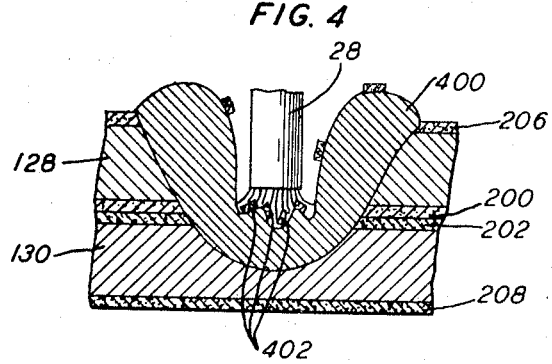

FIG. 4 shows diagrammatically that the oxide interface has been disrupted by the force of the arc which was brought to bear upon the oxide layers when they were resting upon the molten mass below and so were yieldingly supported and could be broken by this force due to the brittleness of the oxide layers. The disruption of the oxide interface has allowed the molten masses above and below the interface to coalesce into a single molten mass 400. Particles 402 of disrupted oxide interface are represented as floating upon the surface of the molten mass 400 somewhat as blocks of wood floating upon a rippled surface of water.

Figure 5:
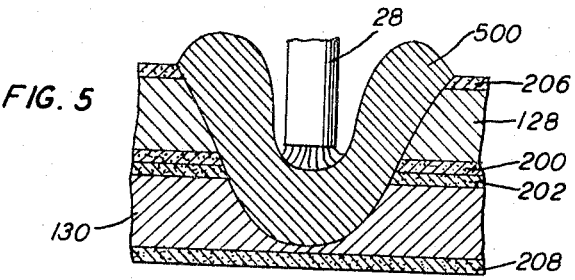

FIG. 5 shows the stage after the coalesced pool has been extended downward as shown at 500, close to the bottom layer 208 of oxide.

Figure 6:
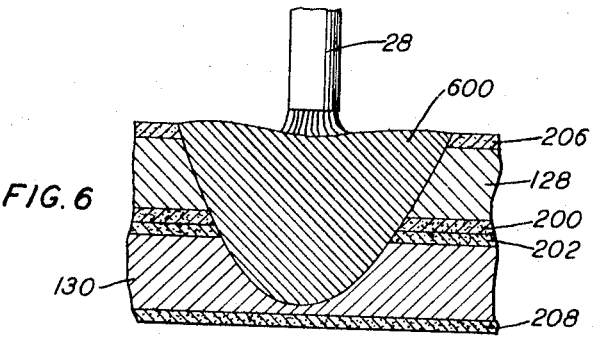

FIG. 6 shows the electrode 28 returned to its raised position, and the state of the metal at 600 after the molten mass has receded so as to fill the crater.

Figure 7:
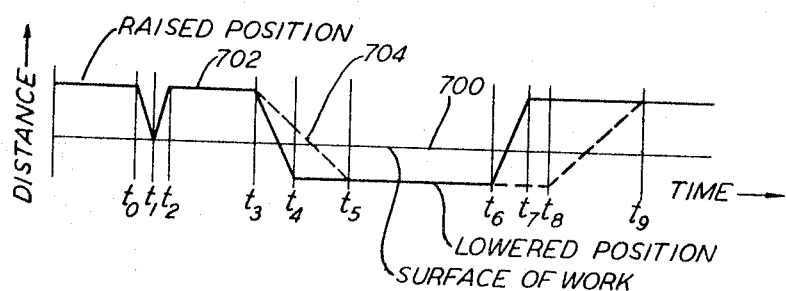
FIG. 7 is a graph illustrating a program of electrode positions as a function of time, suitable for carrying out a method of welding according to the invention.

FIG. 7 shows illustrative programs for governing the positioning of the electrode as a function of time in order to carry out a method of welding according to the invention. The horizontal line 700 represents the upper surface of the work. The distance of the lower end of the electrode from the work surface is measured vertically and time is measured horizontally. The solid line graph 702 represents the motion of the electrode tip as a function of time for one speed of operation of the piston 36. Prior to time $t_0$, the electrode tip is in the raised position. The piston is started downward at time $t_0$ and at time $t_1$ the electrode tip strikes the surface of the work and is stopped thereby. By known means used in touch-retract arc starting, the piston is moved upward immediately after the electrode touches the workpart to start the arc. If desired, any other suitable arc starting method may be used instead of the touch-retract method. After a time interval sufficient to form a pool of molten metal in the upper workpart, the piston again is moved downward, at a predetermined rate. This time the electrode is not stopped at the upper surface but continues down to the lowered position as shown in FIGURE 3. The electrode is maintained in the lowered position for a predetermined time interval ending at time $t_6$, at which time the electrode is started upward, reaching the raised position at time $t_7$. A suitable arc current is then maintained for a sufficient interval of time to complete the weld in accordance with the invention.

By suitable programming of the action of the throttle valves 156, 158, the time interval required for the rise and fall of the piston may be adjusted to obtain the best results in the welding operation. The broken line graph 704 in FIG. 7 shows a slower movement between the raised and lowered positions, the piston falling from time $t_3$ to time $t_5$ and rising from time $t_8$ to time $t_9$. The time spent in the lowered position from $t_5$ to $t_8$ is shown as equal to the time interval between $t_4$ and $t_7$ for the solid line graph. It will be evident that the length of the interval in which the electrode is in the lowered position or in the raised position can be varied by appropriate programming in known manner.

The length of the stroke of the piston 36 can be adjusted within the limits set by the stops 40, 66, by appropriately positioning lock-nuts 62, 64 upon the piston rod 34 so as to limit the downward motion of the piston rod when the lock-nut 64 strikes against a stop 66 on the cylinder casing.

It will be evident that various equivalent means may be used instead of the pneumatic piston arrangement for moving the electrode up and down and controlling the extent and speed of its motion. For example, a solenoid may be used to move the electrode, and suitable cams may be introduced between the moving member and the electrode to govern the speed and extent of the motion. It will also be evident that the length of stroke of the piston or of the solenoid may be adjusted as required.

In an embodiment of the invention in which the electrode position remains substantially fixed with respect to its distance from the workparts and the arc current is varied to effect the desired welding operation, FIGS. 2 through 6 will represent approximately the state and position of the material of the workparts and it is only necessary to assume that the electrode in FIGS. 3, 4 and 5 remains in the raised position as depicted in FIGS. 2 and 6, while the arc current is increased to such an extent that the configuration of the molten material is substantially as shown in FIGS. 3, 4 and 5.

Figure 8:
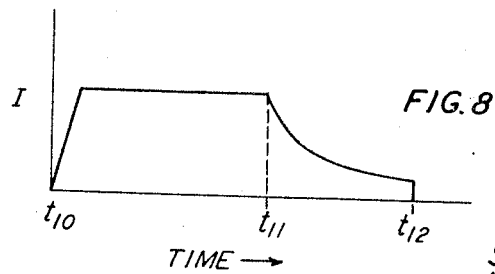
FIG. 8 is a graph illustrating a program of arc current as a function of time, suitable for carrying out spot welding with the electrode in a fixed position in accordance with the invention.

FIG. 8 shows an illustrative program of arc current as a function of time. The arc current is turned on at time $t_{10}$ and rises to a current value sufficient to impart to the arc the required heat and force to disrupt the oxide coatings and produce the desired coalescence. During the time interval from $t_{11}$ to $t_{12}$, the current is allowed to fall off gradually, while the crater is filled and entrapped gas bubbles are permitted to escape, thereby completing the weld.

In some cases, it will be desirable to use filler wire in completing the weld to avoid cracking and to improve weld appearance.

The same apparatus and methods herein described are applicable whether or not a tenacious and/or refractory interface is present. The apparatus is substantially the same as shown in FIG. 1 and it is operated in substantially the same way. The FIGS. 2-7 apply as before, it being only necessary to assume that there is no tenacious and/or refractory material present at the interface. The programming may be adjusted for best results in the absence of the coatings.

With relatively thin material, to achieve the basic aim of placing the arc force in proper proximity to the interface, the tip of the electrode may not need to be moved to a point within the top sheet; in fact, for very thin material, the tip of the electrode may be maintained in the proper position relative to the interface throughout the weld cycle.

Usually, in the case of a relatively thick workpart, it will not be feasible to hold the electrode in fixed position relative to the workparts and increase the welding current to deepen the crater, because the current required will be excessive. It is in fact a distinct advantage of the use of the invention on thick workparts, especially in mass production, that once a program is set up it is not necessary to change the arc current or arc voltage, the whole process being carried out by moving the electrode relative to the workparts. Alternatively, when advantageous, current or voltage may be programmed at any stage of the welding cycle.

In arc welding thick workparts in accordance with the invention, the diameter of the weld may be adjusted over a relatively wide range, by coordinating the diameter of the electrode, the intensity of the welding current, the closeness of the electrode tip to the plane of the interface in the advanced or down position, and the length of the time interval during which the electrode is in the down position. For a large area of weld, a larger electrode and higher current are used, the electrode tip being advanced less close to the interface but held there for a relatively longer time.

In a series of successful tests of the invention, a comparison was made with welding results using prior art spot welding technique. In these tests, the spot welding equipment was of the tungsten electrode, inert gas shielded type, using argon as the shielding gas, with a gas flow rate of about 10 to 12 cubic feet per hour. Direct current, straight polarity welding power was supplied to the electric arc from a standard 300-ampere capacity welding power supply. Each weld in the test was made between an upper sheet of 0.062 inch thickness and a lower sheet of 0.100 inch thickness. The sheets were of a typical aluminum alloy, known as type 5456. The arc was started with the aid of high frequency starting potential with a 0.030 inch gap between the preheated electrode tip and the top surface of the upper sheet. A 60 cycle per second timing wave was used to time the successive operations in each of the welds. To begin the weld, the electrode was held in the raised or starting position during 10 cycles of the timing wave. The electrode was then lowered 0.092 inch, bringing the tip of the electrode to approximately the level of the oxide interfaces. The electrode was held in this down position during 15 cycles of the timing wave and then was raised to the initial position and kept there for 50 cycles of the timing wave to complete the weld in a total of approximately 75 cycles of the timing wave, or approximately one and one-quarter seconds.

The arc current was controlled by a control device which was maintained at a setting such as to produce about 230 amperes, direct current, straight polarity.

In the tests, a comparison was made between welds made on cleaned aluminum sheets and welds made on uncleaned sheets, as well as between welds made by prior art methods and welds made in accordance with the present invention.

It should be noted that there is a time factor involved in oxidation of sheets of material such as aluminum. Using aluminum as an example, upon removal of the sheets from a chemical cleaning bath, the material begins to oxidize instantly, forming a very thin layer which increases in thickness with time. Thus, chemically clean aluminum (or aluminum clean by any means) should present little difficulty if welded immediately; however, some effect due to oxide should be expected in welds made with recently cleaned aluminum. Such an effect did in fact appear in the tests.

For comparison purposes, test welds were made in four groups. The first group of welds was made on chemically cleaned aluminum alloy using the procedure of the present invention. The second group of welds was also made on chemically cleaned aluminum alloy but using the standard prior art spot welding procedure. Ten welds from each of the first and second groups were tested in the usual destructive test to measure tensile shear strength of the welded joint. The welds in these two groups were of good average tensile shear strength, but the variation in tensile shear strengths of the ten welds made in accordance with the present invention was about 89 percent compared with 175 percent for the ten welds made according to the standard prior art spot welding procedure.

The third and fourth groups of welds were made on uncleaned aluminum alloy just as received from commercial suppliers. The third group was made in accordance with the procedure of the present invention. All of the welds in the third group were of good tensile shear strength as shown by measurements similar to those made on the other groups. The average tensile shear strength found for the third group was about 74 percent of that found for the group of welds made on chemically cleaned metal in accordance with the present invention and was entirely adequate to meet even the most severe specifications. This results was achieved without any effort or expense being devoted to cleaning or preparing the materials in any way prior to welding. The welds in the fourth group were made in accordance with standard prior art spot welding procedure, on uncleaned metal workpieces. Of the ten specimens in this group, only two showed any measurable tensile shear strength. The reason for the failure of the other specimens was investigated and it was found that the oxidized surfaces at the interface prevented penetration of the weld into the lower sheet.

With prior art methods, there has been a maximum upper limit of thickness of top sheet of approximately 0.090 inch in order to meet the present day high strength requirements for arc spot welds. Beyond this thickness, the conically shaped fusion zone produced by the prior art methods has not provided a weld area at the interface sufficient to produce the required strength in the weld. By using the present invention, we have arc spot welded together three-sixteenth (0.187) inch stainless steel sheets, meeting very strict modern requirements for welds in sheets of that thickness.

Comparative tests have been made of arc spot welds made in one-eighth inch stainless steel sheets in accordance with the present invention as compared to arc spot welds in the same material using prior art methods. Of six attempted welds made by prior art methods, only two welds were effected. Of these, one broke under 300 pounds in tension and the other broke as it was being placed in the testing machine. On the other hand, five welds made in accordance with the present invention had an average measured tensile shear strength of 5,390 pounds with strength variation among the samples amounting to only 5.2 percent of the average strength.

Using the methods of the invention, sheets one-quarter inch or more in thickness may be successfully arc spot welded, the upper limit of thickness depending upon the required strength of the weld.

The welding tool may be either machine operated while clamped in a fixture or stand, or it may be hand operated, by holding the nozzle against the upper workpart.

Relative movement of the electrode and the work may be accomplished in a variety of ways, including for example, electrically by means of a solenoid, mechanically by means of a cam, etc., as well as by pnuematic means as illustrated herein.

Starting of the arc may be accomplished in any suitable manner, including for example high frequency starting, touch-retract movement of the electrode, etc., either with or without pre-heating of the electrode.

For shielding of the arc, any suitable shielding gas may be used, such as argon, helium or their mixtures in the case of aluminum.

The nonconsuming electrode 28 may be of any suitable form and composition, for example thoriated tungsten containing two percent of thorium.

While illustrative forms of apparatus and methods in accordance with the invention have been described in shown herein, it will be understood that numerous changes may be made without departing from the general principles and scope of the invention.

We claim:

1. The method of forming a spot weld between first and second workparts which are lapped at an interface with the use of a substantially constant current electric arc, employing a substantially nonconsuming electrode, said method comprising the steps of forming a pool of molten metal in said first workpart, moving said electrode toward said interface using sufficient arc current to enable the force of the arc to melt and force aside as it advances metal of said first workpart, holding said electrode substantially fixed relatively to said workparts for a predetermined time interval in a position in proper proximity to said interface to melt and force aside a region of both said workparts, said region having a desired area at said interface, thereby maintaining a crater about said electrode; and thereafter withdrawing said electrode to a position beyond the original surface of said first workpart to permit the said forced-aside metal to refill the said crater and coalesce to form a weld of predetermined area between said workparts at said interface.

2. An electric arc welding method for spot welding first and second workparts which are lapped at an interface, employing a substantially nonconsuming electrode and wherein said electric arc current is substantially constant, said method comprising the steps of holding said electrode during a first time interval in a substantially fixed retracted position sufficiently close to said first workpart to form a pool of molten metal in said first workpart; advancing said electrode toward said workpart thereby melting additional metal thereof, and forcing aside molten metal of said pool to form a crater therein, and deepening said pool and crater to a point in close proximity to said second workpart; holding said electrode substantially fixed in said advanced position during a second time interval to melt a portion of said second workpart and to force aside additional molten metal; and thereupon withdrawing said electrode to a retracted position to permit the said forced-aside molten metal from both said workparts to return and coalesce, whereby said crater is refilled and a weld is formed between said workparts.

3. The method according to claim 2, together with the additional step of holding the electrode in the last-mentioned retracted position during a third time interval to prolong the heating of the molten material during coalescence and solidification thereof.

4. An electric arc welding method for spot welding first and second workparts which are lapped at an interface, employing a substantially nonconsuming electrode and wherein said electric arc current is substantially constant, the method comprising the steps of playing the arc upon the surface of a first said workpart for a time interval sufficient to melt a region of said workpart through to said refractory interface, forcing aside molten material of said workpart by advancing the electrode into close proximity to said refractory interface, playing the arc upon said refractory interface at close range to melt a portion of the second workpart beneath said refractory interface and to disrupt by force of the arc the said refractory interface, and withdrawing the electrode sufficiently to permit the said forced aside molten material from both workparts to flow back into and fill the crater left by it to form a weld between said first and second workparts.

5. The method according to claim 4, together with the additional step of holding the electrode in the said withdrawn position for a time interval to prolong the heating of the molten material during the coalescence thereof.

6. The method of arc spot welding first and second contacting refractory coated metal sheets in an uncleaned state as such sheets are ordinarily received from the usual suppliers thereof, the thinner of said sheets having a thickness in the range from 0.010 inch to 0.250 inch, said method using a substantially nonconsuming electrode from which a substantially constant current arc is maintained and comprising the steps of melting a region of said first sheet through to a refractory interface formed by the refractory coatings of said contacting sheets, thereafter advancing said electrode toward said workpiece thereby disrupting said refractory interface by force of the arc substantially directly impressed upon said interface while temporarily forcing aside molten material of said first sheet, melting a region of said second sheet, and withdrawing said electrode from its advanced position thereby permitting the return and coalescence of said molten material from both said sheets to form a weld.

References Cited
UNITED STATES PATENTS

| | | | |
|---|---|---|---|
| 2,583,665 | 1/1952 | Pilia | 219—127 |
| 2,761,956 | 9/1956 | Potter et al. | 314—61 X |
| 2,762,946 | 9/1956 | Manchester | 219—69 X |
| 3,001,058 | 9/1961 | Faber et al. | 219—127 |
| 3,102,948 | 9/1963 | McCampbell et al. | 219—137 |

RICHARD M. WOOD, *Primary Examiner.*

R. F. STAUBLY, *Assistant Examiner.*